United States Patent [19]

Scharfen

[11] 3,880,437
[45] Apr. 29, 1975

[54] CHUCK FOR MACHINE TOOLS
[75] Inventor: Hans Scharfen, Meerbusch, Germany
[73] Assignee: Paul Forkardt Kommanditgesellschaft, Dusseldorf, Germany
[22] Filed: Nov. 27, 1972
[21] Appl. No.: 309,648

[30] Foreign Application Priority Data
Nov. 25, 1971  Germany............................ 2158427

[52] U.S. Cl. .................................................. 279/5
[51] Int. Cl. ............................................. B23b 31/34
[58] Field of Search .................................. 279/5, 6

[56] References Cited
UNITED STATES PATENTS
3,682,492  4/1972  Scharfen et al. ......................... 279/5
FOREIGN PATENTS OR APPLICATIONS
618,240  2/1961  Italy ........................................ 279/5

*Primary Examiner*—Francis S. Huar
*Attorney, Agent, or Firm*—Walter Becker

[57]  ABSTRACT

A clamping chuck for machine tools with exchangeable clamping jaws of which at least one clamping jaw for purposes of chucking a work piece is radially adjustable by means of a clamping mechanism, said clamping jaws being shiftable by a swivel mechanism. The swivel mechanism permits pivotal movement about a plurality of axes by a predetermined angle for machining the workpiece along said axes. The clamping jaws are provided with prism-shaped clamping surfaces for receiving clamping webs provided on the respective workpiece, said clamping surfaces forming the four corners of an imaginary tetrahedron-shaped three-dimensional body.

2 Claims, 11 Drawing Figures 3,880,437

CHUCK FOR MACHINE TOOLS

The present invention relates to a chuck for machine tools with exchangeable clamping jaws of which at least one jaw is radially adjustable by a clamping mechanism for chucking a work piece, said clamping jaws, for machining a work piece according to a plurality of axes thereof being adapted together with the chucked work piece to be pivoted by a predetermined angle by means of a swiveling device driving at least one clamping jaw.

Chucks of this type which are customarily designated as swivel chucks are known according to which the swiveling mechanism comprises preferably a plurality of push rods offset by a portion of the pivot angle and adapted to act upon a pivot shaft. Swivel chucks of this type have proved highly satisfactory in practice in connection with numerous machining problems because they permit an economic and uniformly precise machining of work pieces according to a plurality of axes thereof.

Inasmuch as work pieces clamped into a swivel chuck are machined along a plurality of axes from different sides and in a different manner, a safe seat of the work piece in the chuck is of foremost importance. The work pieces to be machined are in most instances complicated raw work pieces which are produced preferably by casting or forging.

In order to insert into the chuck work pieces of the above mentioned type with a centering necessary for the machining operation, primarily two chucking aids are known. In one instance the work piece is aligned in a box-shaped cassette by means of clamping screws and together with this cassette is clamped in by the chucking jaws. In the other instance, a mechanical premachining of the work piece is effected by boring clamping holes which are engaged by clamping pins arranged in the clamping jaws. While in the first mentioned instance the clamping operation proper is rather simple, the additional insertion of the cassette results in a relatively great weight of the parts to be chucked so that necessarily larger chucks are needed. In the second instance the employment of clamping bores not only requires an additional machining of the work piece but also the employment of an additional drilling device. Consequently, in the second instance not only the machining operations and devices necessary for carrying out the same increase but frequently the work piece is weakened to an undesired extent.

It is, therefore, an object of the present invention to provide a chuck of the above mentioned general type for machine tools, which will permit the self-centering chucking of non-machined and not prepared work pieces.

It is another object of this invention to provide a chuck as set forth in the preceding paragraph in which the stroke of the clamping jaws necessary for the insertion of the work piece will be limited to a minimum so that the ratio in size between machine tool and work piece will best be made use of.

These and other objects and advantages of the invention will appear more clearly from the following specification in connection with the accompanying drawings, in which.

Figure 1:
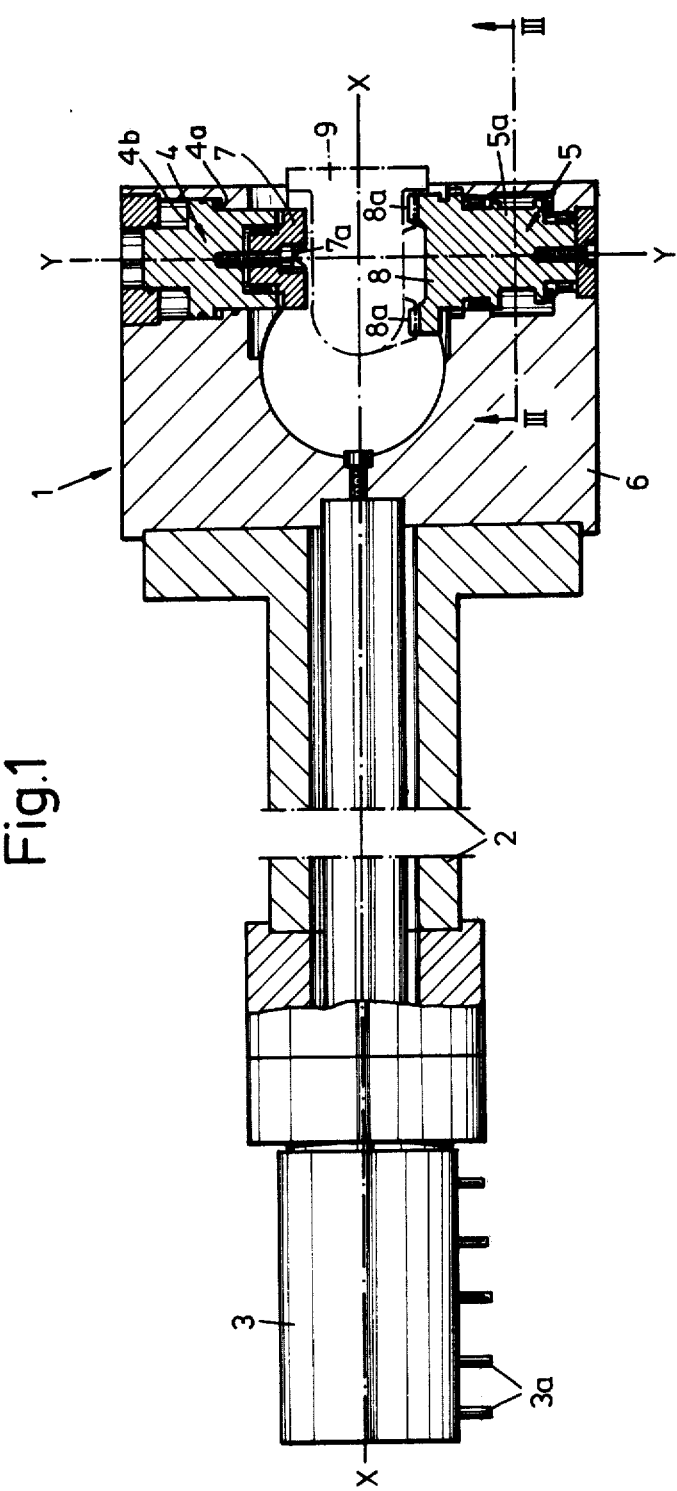
FIG. 1 is an overall illustration, partially in section, of the chuck according to the invention connected to a spindle.

The chuck according to the present invention is characterized primarily in that the clamping jaws are each respectively equipped with two prism-shaped clamping surfaces for receiving or engaging clamping webs provided on the work piece for receiving the latter, while the clamping surfaces form the four corners of an imaginary tetrahedron-shaped three-dimensional body.

The employment of four prism-shaped clamping surfaces which are arranged in pairs at the two clamping jaws and are arranged relative to each other so as to form the four corners of an imaginary tetrahedron-shaped three-dimensional body automatically results in a centric and repeat precision clamping of the work pieces provided with clamping webs. By means of the clamping surfaces arranged in pairs and along a line, the work pieces are slidably guided in the longitudinal direction of each clamping jaw in such a way that in cooperation with the prism-shaped design of the clamping surfaces no particular requirements have to be met by the coarse alignment of the work pieces when moving the clamping jaws together.

When machining work pieces along different axes, frequently the necessity is encountered to displace the work piece relative to the first clamping by an amount $x$ because the machining axes do not intersect in one point. This is the case for instance with wedge valve housings when the flange axes do not coincide with the central line of the sealing surfaces for the wedge valve, which sealing surfaces are slanted by from 5° to 10°. According to a further development of the chuck according to the invention, the central offset originating with the work piece is to be obtained by employing the same chucks.

To this end, it is suggested according to the present invention to design the clamping surfaces on clamping mountings which for purposes of obtaining a central offset are displaceably mounted on the clamping jaws transverse to the clamping line extending through the clamping surfaces.

The transversely displaceable mounting of the clamping mountings equipped with the clamping surfaces permits a stepless lateral offset so that on the basis of the design and arrangement of the clamping surfaces in conformity with the present invention, after a brief opening of the clamping jaws and after a lateral offset of the clamping surface pair, a renewed chucking of the work piece with the desired central offset can be realized. For obtaining the central offset, no exchange of clamping jaws and no awkward aligning of the work piece is necessary because also the transversely offset clamping surfaces bring about a self-centering chucking of the work piece.

For a preferred embodiment of the chuck for purposes of obtaining a central offset $x$ called for by the construction of the work piece, between the machining axes, it is suggested according to the invention to offset the clamping surfaces arranged in pairs and the pertaining clamping webs of the work piece respectively by half the central offset $x$ relative to the pivot axis of the clamping jaws and relative to the center of the work piece so that solely by turning the respective clamping jaw, the desired previously determined central offset will be effected. The rotatable mounting of the clamping jaws will be taken advantage of, which is provided anyhow for purposes of being able to control the clamping jaws.

Referring now to the drawings in detail and for a better understanding of the fundamental construction and operation, FIG. 1 shows a diagrammatic overall illustration partly in section and partly in view of a chuck 1 which is connected to a spindle 2 of a non-illustrated machine tool. The rear end of spindle 2 is provided with an oil feed 3 which through oil conduits 3a receives the required oil under pressure for chucking and for stepwise advancing the clamping jaws of the swivel chuck 1. From the overall illustration according to FIG. 1, the basic buildup of the swivel chuck 1 with the clamping mechanism 4 and a swivel mechanism 5 will be evident. The clamping mechanism 4 and the swiveling mechanism 5 are located opposite to each other and are built into the chuck body 6 of the swivel chuck 1 while respectively being equipped with a clamping jaw 7, 8. Between these clamping jaws 7 and 8, there is clamped in the work piece 9 which in the specific showing represents a wedge valve housing. This housing is turned about the axis of rotation X—X for machining by a machine tool. In order to be able to move various areas to be machined of the work piece 9 into their respective machining position, the clamping jaws 7 and 8 with the clamped-in work piece are pivotable about the pivot axis Y—Y. With the swivel chuck 1 illustrated in FIG. 1, merely one and, more specifically, the clamping jaw 7 is radially adjustable for clamping in and releasing the work piece 9, whereas the clamping jaw 8 is radially non-adjustably connected to the pivot mechanism 5. The radial adjustment of the clamping jaw 7 is effected by means of the clamping mechanism 4 which for this purpose is designed with two oppositely located piston surfaces 4a and 4b so that the action of the pressure medium upon one surface will respectively bring about a radial displacement of the clamping mechanism 4 which carries the clamping jaw 7. For shifting the work piece 9 clamped in between the clamping jaws 7 and 8, there is provided a swivel mechanism 5 carrying the clamping jaw 8 and journalled rotatably in the chuck body 6. In order to be able to follow the control movement initiated by the pivoting mechanism 5, the clamping jaw 7 is likewise rotatably mounted on the clamping mechanism 4.

Figure 4:
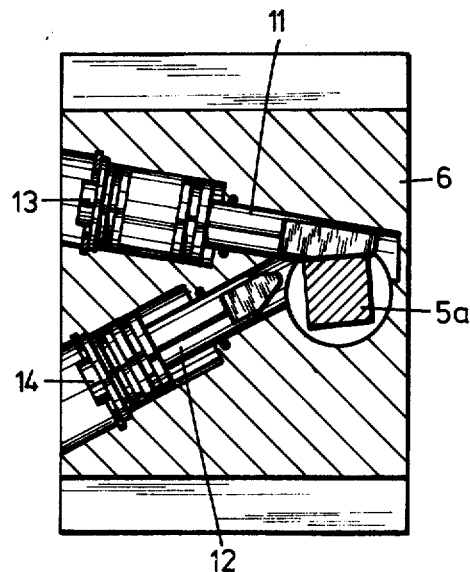
FIG. 4 represents a section similar to that of FIG. 3 in which the swivel device after completion of the swivel operation occupies its locking position.
Figure 3:
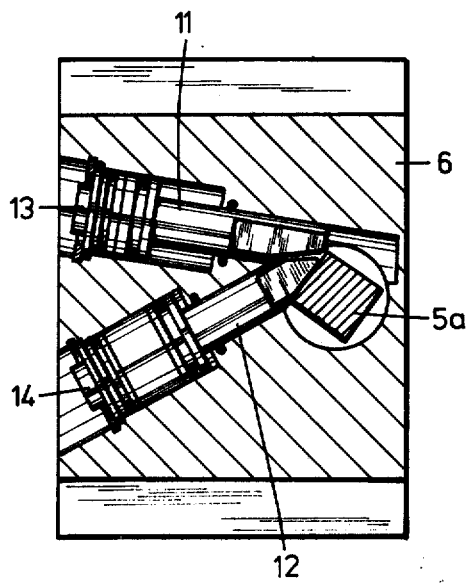
FIG. 3 represents a section taken along the line III—III of FIG. 1 through the swiveling device for the swivel chuck with the swiveling operation approximately halfway completed.

From FIGS. 3 and 4 it will be seen how the swivel mechanism 5 which includes a pivot shaft 5a can by means of push rods 11 and 12 be shifted. The two push rods 11 and 12 cooperate with the pivot shaft 5a designed as square so that each push rod brings about a turning movement by 45°. FIG. 3 shows a position of the pivot shaft 5a after the latter has been turned by the push rods 12 by an angle of 45°. After a return of the push rod 12 from its position in FIG. 3, push rod 11 brings about a turning movement by an additional 45° so that the pivot shaft 5a will occupy its FIG. 4 position when both push rods 11 and 12 have been actuated.

Figure 2:
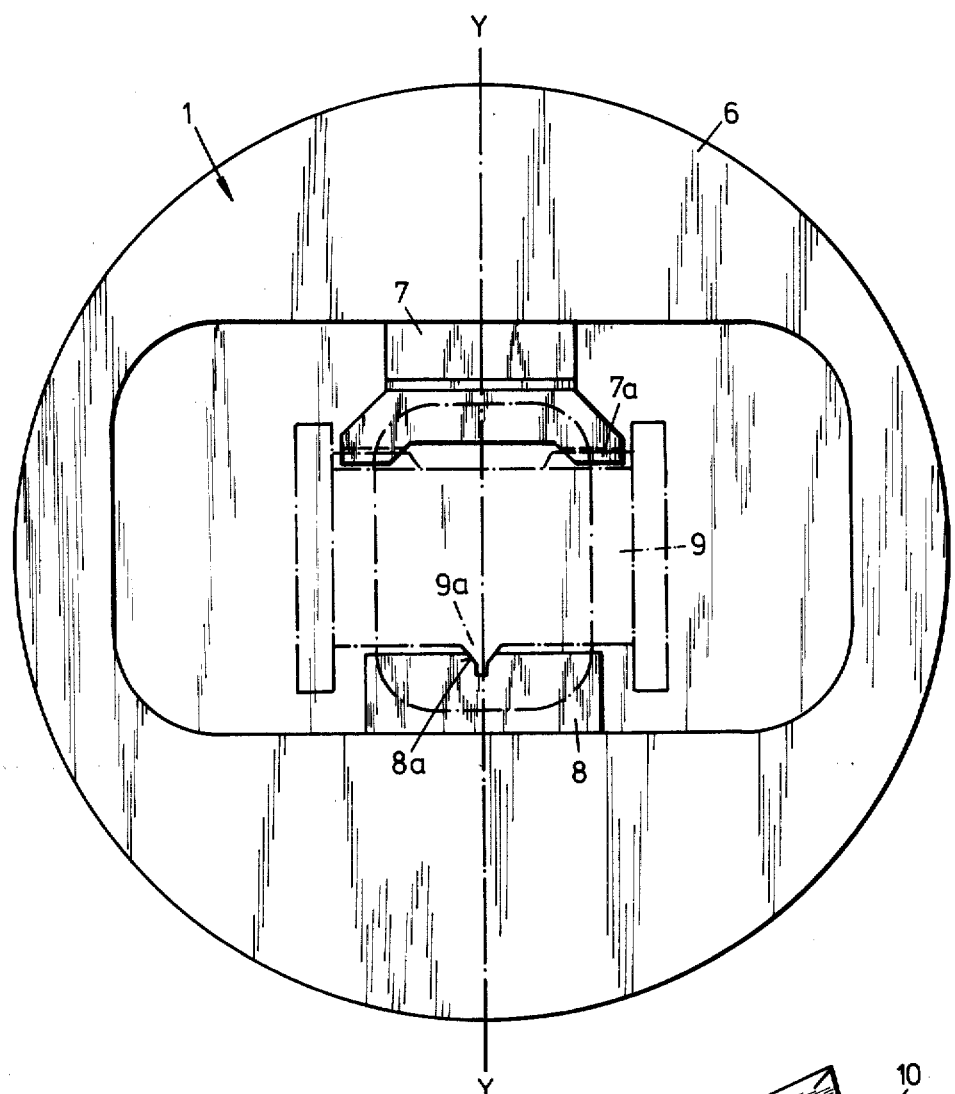
FIG. 2 is a front view of the chuck according to FIG. 1.

The movement of the push rods 11 and 12 is effected by oil under pressure referred to above, which is introduced into the swivel chuck through the hollow spindle 2 from the oil feed 3. Both push rods 11 and 12 have their ends provided with pistonlike thickened portions which are guided in a cylindrical bore of the chuck body 6 and can be acted upon from both sides. In this way, a double acting cylinder is formed which is sealed respectively by a cover 13 and a cover 14. From FIG. 2 showing a front view of the swivel chuck 1 of FIG. 1 on an enlarged scale, the shape of the chuck body 6 will be evident. It will be noticed that the work piece clamped in between the two clamping jaws 7 and 8 is located within a recess of the pot-shaped chuck body 6 and is pivotable about the pivot axis Y—Y.

Figure 5:
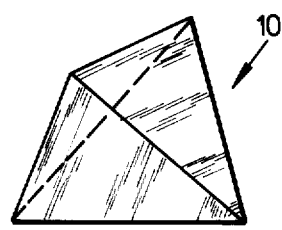
FIG. 5 is a perspective illustration of a tetrahedron.

In order to obtain a self-centering chucking of the work piece 9 with a minimum stroke of the clamping jaw 7 of the clamping mechanism 4, the clamping jaws 7 and 8 are respectively equipped with two prism-shaped clamping surfaces 7a and 8a, respectively, which serve the purpose of receiving the clamping webs 9a on the work piece 9. The prism-shaped clamping surfaces 7a, 8a form the four corners of an imaginary tetrahedron-shaped three-dimensional body 10 whereby the work piece 9 is slidably guided in the longitudinal direction of each clamping jaw 7, 8. After insertion of the work piece 9 into the clamping surfaces 8a of the lower clamping jaw 8, it will be obvious that when the clamping jaw 7 driven by the clamping mechanism 4 moves downwardly, there will be effected a centering relative to the clamping jaw 8, which centering is possible due to the sliding of the work piece 9 in the longitudinal direction of the clamping jaw 8. Furthermore, there will be effected, due to the prism-shaped design of the clamping surface 7a, a centering of the work piece 9 with regard to the clamping jaw 7. The location of the clamping surfaces 7a and 8a at the four corners of an imaginary tetrahedron-shaped three-dimensional body is clearly visible if these clamping surfaces 7a, 8a in FIGS. 1 and 2 are compared with the tetrahedron-shaped three-dimensional body 10 of FIG. 5.

Figure 6:
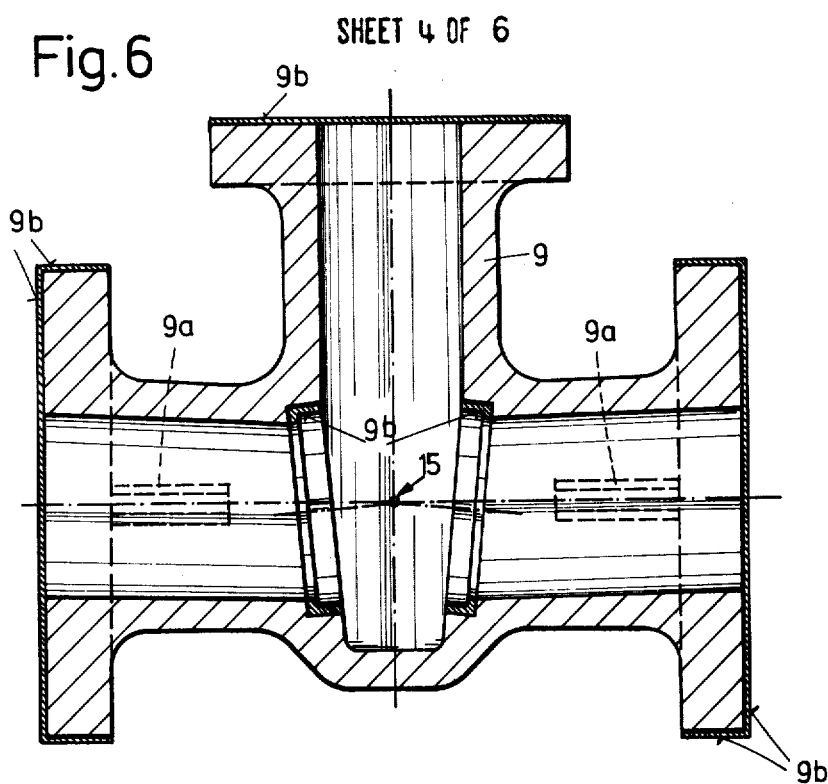
FIG. 6 is a longitudinal section through a wedge valve housing with machining axes intersecting in a point.

FIG. 6 illustrates in a longitudinal section through a wedge valve housing the various axes according to which the work piece 9 clamped in the swivel chuck 1 will be machined. The heavy black lines indicate the machining surfaces 9b which are provided on one hand at the end face and the flange rings of the three flanges of the wedge valve housing, and on the other hand are provided at the sealing surfaces for the seating rings of the wedge valve, which rings are to be inserted but are not illustrated. Inasmuch as with the design of the wedge valve housing according to FIG. 6, the machining axes of the three housing flanges intersect with the machining axes for the two seating ring surfaces in point 15, the work piece 9 can with one chucking operation alone be machined by a corresponding shifting by means of the swivel mechanism 5 at all areas to be machined.

Figure 7:
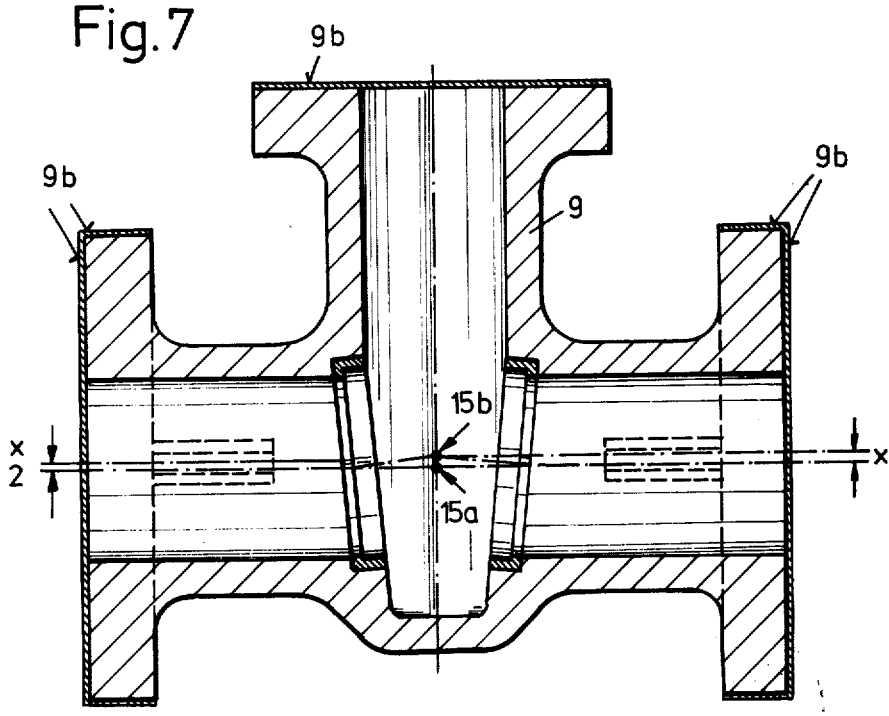
FIG. 7 represents a section similar to that of FIG. 6 in which the machining axes for the outer surfaces and wedge valve surfaces to be machined do not intersect.

According to the embodiment of FIG. 7, the machining axes for the three flanges intersect at point 15a, but the point of intersection 15b for the seating surfaces of the seating rings are offset by the amount x and located adjacent to the point 15a. With such a design of a wedge valve housing, it is, therefore, necessary after machining the surfaces 9b to be machined and confined by the heavy black lines to displace the work piece 9 by the amount x before the work piece 9 is pivoted to the respective machining axis of the seating surface.

Figure 8:
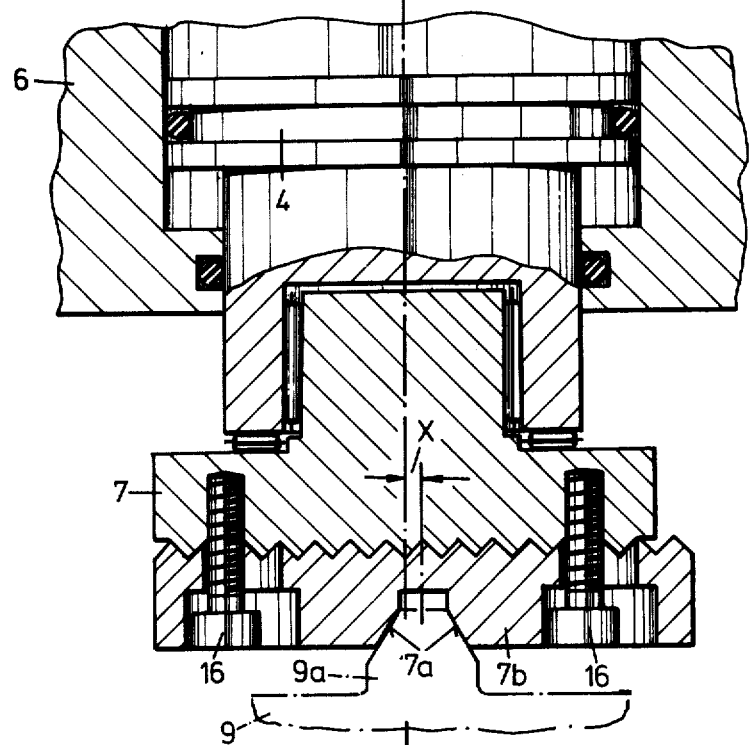
FIGS. 8 and 9 illustrate a longitudinal section through a first embodiment of a clamping jaw adjustable for obtaining a central offset, the scale of FIGS. 8 and 9 being considerably greater than that of the preceding figures.
Figure 9:
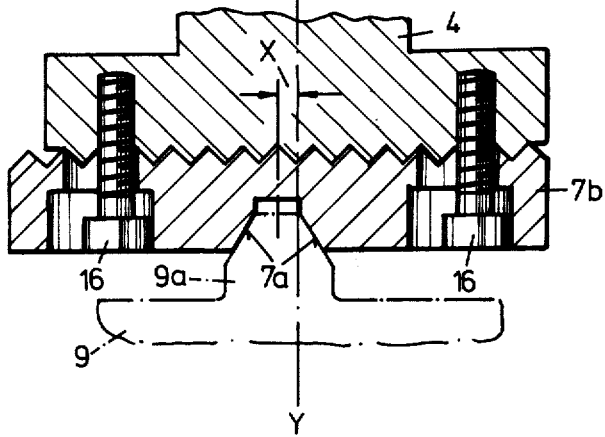

For purposes of obtaining such central offset x, according to the embodiment of FIGS. 8 and 9, the clamping surfaces 7a of the clamping jaw 7 are provided on a clamping mount 7b which is displaceably mounted in transverse direction on the clamping jaw 7. With the illustrated embodiment of the invention, the clamping jaw 7 as well as the clamping mount 7b are at their engaging surface provided with teeth so that the clamping mount 7b after loosening the screws 16 can be laterally offset. The magnitude of the central offset x may be determined at will. It is merely necessary to provide one clamping jaw with an adjustable clamping mount. Instead of the stepwise adjustment as necessitated by the teeth, a stepless adjustment may be provided when the clamping mount 7b is guided for instance in a dovetail-shaped guide on the clamping jaw 7 and is provided with special clamping or arresting means.

In order with the embodiment of FIGS. 8 and 9 to obtain a central offset x, it is merely necessary to stop the clamping chuck 1 in such a way that the clamping jaw 8 will be in its lower position. Thereupon, the clamping jaw 7 is pulled backwardly by actuation of the clamping mechanism 4 so that the clamping surface 7a frees the corresponding clamping webs 9a of work piece 9 which later further remains through the lower clamping webs 9a in the clamping surfaces 8a of the clamping jaw 8. Thereupon, the clamping mount 7b of the clamping jaw 7 is, following the loosening of the screws 16, displaced laterally and arrested in the center of said position. Inasmuch as the center offset x is an offset of a few millimeters, in most instances the prism-shaped design of the clamping surface 7a will suffice in order when moving the swivel chuck together by lowering the clamping jaw 7 to bring about an automatic centering of the work piece 9 between the clamping jaws 7 and 8. After again chucking the work piece 9 in the above described manner, the not yet machined surfaces for the seating ring of the wedge valve may be machined as soon as the swivel mechanism 5 has advanced the work piece 9 to the corresponding machining position.

According to the second embodiment for obtaining a central offset x, the clamping surfaces 7a arranged in a pairs of at least one clamping jaw 7, and the pertaining clamping webs 9a of the work piece 9 are by means of half the central offset x (required due to the construction) offset relative to the pivot axis Y—Y of the swivel chuck 1 and relative to the center of the work piece. While this offset of the clamping surfaces 7a by the amount of x/2 relative to the pivot axis Y—Y is clearly shown in FIGS. 10 and 11, the corresponding offset of the clamping webs 9a on work piece 9 is indicated by dot-dash lines in FIG. 7.

Figure 10:
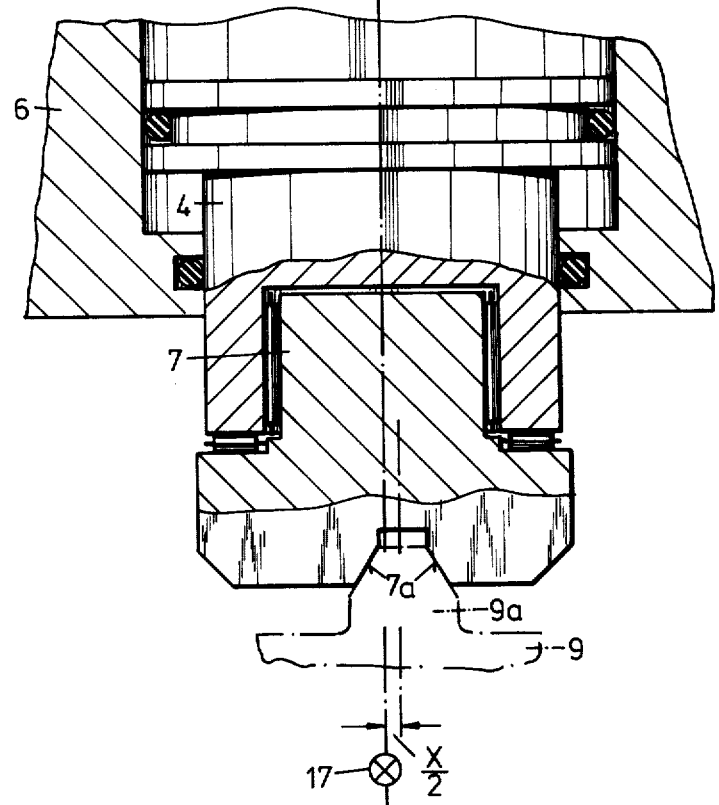
FIGS. 10 and 11 show a second embodiment of an adjustable clamping jaw for purposes similar to those of FIGS. 8 and 9.
Figure 11:
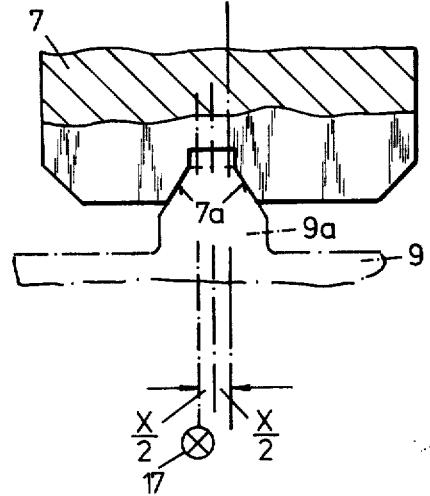

For purposes of machining the surfaces 9b of work piece 9 on the flanges according to FIG. 7, work piece 9 is chucked between the clamping jaws 7 and 8 in such a way that the offset of the clamping surface 7a and of the clamping webs 9a according to FIG. 10 cancel each other out. FIG. 10 also shows that the center 17 of the work piece 9 is located on the pivot axis Y—Y of the swivel chuck 1. For machining the work piece 9 below the machining axes intersecting each other at 15b, the upper clamping jaw 7 is after opening the clamping jaws 7 and 8 turned by 180°, as will be evident from a comparison of the marking points on the right-hand and left-hand side of the clamping jaw 7 in FIGS. 10 and 11. In view of this turning of the clamping jaw 7 by 180°, it will be evident that when the clamping mechanism 4 is closed, a lateral offset of the work piece 9 by the central offset x is effected, said work piece resting unchanged on the lower clamping surfaces 8a of the clamping jaw 8. This is clearly shown in FIG. 11 which indicates that the center 17 of the work piece 9 is now located on the left adjacent the pivot axis Y—Y and spaced therefrom by the amount x. Inasmuch as the clamping jaw 7 is in view of its functioning rotatably journalled in the clamping mechanism 4, it will be evident that, aside from the offset arrangement of the clamping surfaces 7a, no structural change in the swivel chuck 1 occurs while, however, it has to be emphasized that a central offset x obtained in this manner has a definite measurement. Inasmuch as the distance between the points 15a and 15b of the valve housing is caused by the construction, no difficulties are encountered to prepare the swivel chuck 1 for this definite center offset x, especially since when machining wedge valve housings of different sizes, exchange of the clamping jaw 7 can be effected without difficulties.

As will be evident from the above, the present invention creates a chuck which, due to its design and arrangement of its clamping surfaces on the clamping jaws, simplifies not only the chucking of the work pieces and permits a high repeat precision of the chucking operation, but also makes possible an optimum exploitation of the power installed in the machine tool. The chucking according to the invention requires only a relatively short opening stroke of the clamping jaws for removing and inserting of work pieces so that the available size of the swivel chuck and thus also the power of the machine tool provided for the magnitude of the swivel chuck can be fully taken advantage of.

It is, of course, to be understood that the present invention is, by no means, limited to the particular showing in the drawings but also comprises any modifications within the scope of the appended claims.

I claim:

1. A clamping chuck rotatable about a first axis for machine tools with exchangeable clamping jaws at least one of which is radially adjustable for chucking a work piece provided with clamping webs, which includes: a clamping mechanism associated with said radially adjustable jaw for radially adjusting the latter, a swivel mechanism operatively connected to at least one of said clamping jaws for pivoting the same about a second axis by a predetermined pivot angle whereby in combination with the rotation of said chuck a work piece can be machined at one setting according to two axes, said clamping jaws being each provided with two prism-shaped clamping surfaces for receiving the work piece at its clamping webs, said clamping sufaces being so arranged as to form the four corners of an imaginary tetrahedron-shaped three-dimensional body, said clamping jaws including clamping mounts forming the work piece clamping means proper and being selectively adjustable relative to the remaining part of the respective clamping jaw along a line transverse to the longitudinal extension of said work piece clamping surfaces for obtaining an offset center of the clamping jaws.

2. A clamping chuck rotatable about a first axis for machine tools with exchangeable clamping jaws at least one of which is radially adjustable for chucking a work piece provided with clamping webs and to be machined along axes which intersect at a point offset by a distance $x$ relative to the center of said work piece, said clamping webs being offset relative to the center of said work piece by $x/2$, which includes a clamping mechanism associated with said radially adjustable jaw for radially adjusting the latter, a swivel mechanism operatively connected to at least one of said clamping jaws for pivoting the same about a second axis located in the plane of symmetry passing through said clamping jaws and said swivel mechanism by a predetermined pivot angle, whereby in combination with the rotation of said chuck a work piece can be machined at one setting according to two axes, said clamping jaws being each provided with two prism-shaped clamping surfaces for receiving the work piece at its clamping webs, said clamping surfaces being offset by $x/2$ relative to that pivot axis which is located in the plane of symmetry passing through said clamping jaws and said swivel mechanism.

* * * * *